United States Patent
Xu

(10) Patent No.: US 11,402,847 B2
(45) Date of Patent: Aug. 2, 2022

(54) ARTICLE TRANSPORTATION METHOD, TERMINAL AND COMPUTER-READABLE STORAGE MEDIUM

(71) Applicant: HANGZHOU HIKROBOT TECHNOLOGY CO., LTD., Zhejiang (CN)

(72) Inventor: Bingyan Xu, Zhejiang (CN)

( * ) Notice: Subject to any disclaimer, the term of this patent is extended or adjusted under 35 U.S.C. 154(b) by 251 days.

(21) Appl. No.: 16/630,820

(22) PCT Filed: Jun. 27, 2018

(86) PCT No.: PCT/CN2018/093156
§ 371 (c)(1),
(2) Date: Jan. 13, 2020

(87) PCT Pub. No.: WO2019/011127
PCT Pub. Date: Jan. 17, 2019

(65) Prior Publication Data
US 2021/0089046 A1 Mar. 25, 2021

(30) Foreign Application Priority Data
Jul. 13, 2017 (CN) .................. 201710571280.5

(51) Int. Cl.
*G05D 1/02* (2020.01)
*G01B 11/02* (2006.01)

(52) U.S. Cl.
CPC ......... *G05D 1/0246* (2013.01); *G01B 11/026* (2013.01); *G05D 1/0212* (2013.01); *G05D 2201/0216* (2013.01)

(58) Field of Classification Search
CPC .............. G05D 1/0246; G05D 1/0212; G05D 2201/0216; G01B 11/026; B66F 9/063; B66F 9/0755

(Continued)

(56) References Cited

U.S. PATENT DOCUMENTS

| 4,050,599 A | * | 9/1977 | Bender | .................. B66F 9/145 |
| | | | | 414/659 |
| 4,130,212 A | * | 12/1978 | Gatilao | .................. B66F 9/187 |
| | | | | 414/607 |

(Continued)

FOREIGN PATENT DOCUMENTS

| CN | 102735235 A | 10/2012 |
| CN | 102941864 A | 2/2013 |
| CN | 103123682 A | 5/2013 |

(Continued)

OTHER PUBLICATIONS

Extended European Search Report of corresponding European Patent Application No. 18831876.0—8 pages (dated Jun. 12, 2020).

(Continued)

*Primary Examiner* — Dalena Tran
(74) *Attorney, Agent, or Firm* — Knobbe Martens Olson & Bear LLP

(57) ABSTRACT

An article transportation method, comprising: controlling an automated guided vehicle (AGV) to move to a bottom of a target article, the target article being an article to be moved; determining an offset distance between a critical position of the AGV and a critical position of the target article; controlling the AGV to perform position adjustment according to the offset distance until a central position of the AGV corresponds to a central position of the target article; and controlling the AGV to lift the target article at a current position and move the target article. A terminal and a computer-readable storage medium are further provided.

17 Claims, 7 Drawing Sheets

(58) Field of Classification Search
USPC .............. 701/23; 414/217, 222.13, 401, 805
See application file for complete search history.

(56) References Cited

U.S. PATENT DOCUMENTS

| | | | | |
|---|---|---|---|---|
| 4,688,981 | A | * | 8/1987 | Ravnsborg ................ B66F 9/12 414/607 |
| 4,699,565 | A | * | 10/1987 | Seaberg .................... B66F 9/12 403/317 |
| 2017/0022010 | A1 | | 1/2017 | D'Andrea et al. |
| 2017/0108874 | A1 | | 4/2017 | Peters et al. |

FOREIGN PATENT DOCUMENTS

| | | |
|---|---|---|
| CN | 103472827 A | 12/2013 |
| CN | 103472854 A | 12/2013 |
| CN | 203833166 A | 9/2014 |
| CN | 104166400 A | 11/2014 |
| CN | 104407615 A | 3/2015 |
| CN | 204856895 U | 12/2015 |
| CN | 106347550 A | 1/2017 |
| CN | 106379684 A | 2/2017 |
| CN | 106774316 A | 5/2017 |
| JP | H10218006 A | 8/1998 |

OTHER PUBLICATIONS

Office Action of corresponding Chinese Patent Application No. 201710571280.5—12 pages (dated Jun. 4, 2020).
International search report in PCT application No. PCT/CN2018/093156 dated Sep. 29, 2018.
First office action of Chinese application No. 201710571280.5 dated Aug. 29, 2019.

* cited by examiner

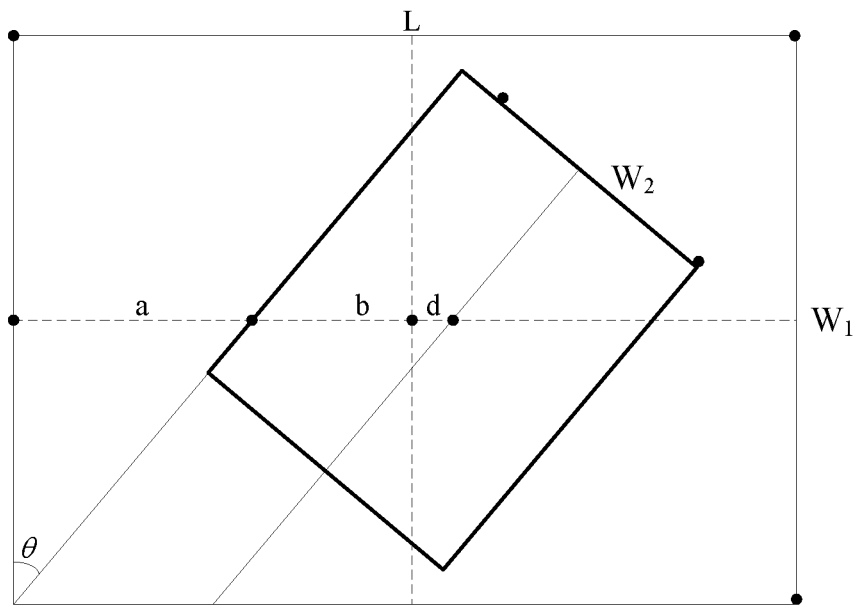

FIG. 2C

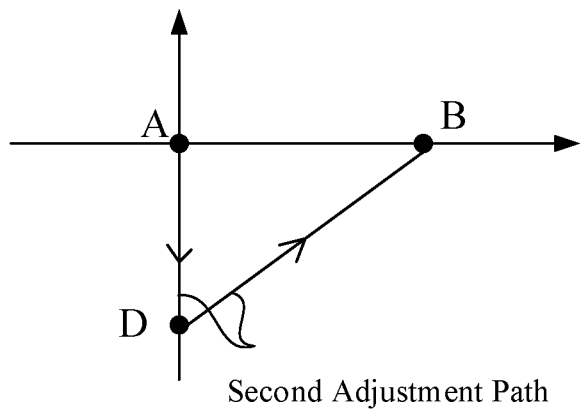

Second Adjustment Path

FIG. 2D

| During a process of controlling the AGV to move the target article, judging whether the offset distance between the critical position of the AGV and the critical position of the target article is greater than a third predetermined distance threshold | 301 |

↓

| Generating an alarm when the offset distance is greater than the third predetermined distance threshold | 302 |

FIG. 3

ARTICLE TRANSPORTATION METHOD, TERMINAL AND COMPUTER-READABLE STORAGE MEDIUM

This disclosure claims priority to Chinese Patent Application No. 201710571280.5, filed before the National Intellectual Property Administration, PRC on Jul. 13, 2017 and entitled "ARTICLE TRANSPORTATION METHOD AND APPARATUS, TERMINAL AND COMPUTER-READABLE STORAGE MEDIUM THEREOF", the entire contents of which are incorporated herein by reference.

TECHNICAL FIELD

The present disclosure relates to an article transportation method, a terminal and a computer-readable storage medium.

BACKGROUND

With developments of electronics and control technologies, the automated guided vehicle (AGV) technology is advanced continuously. The AGV, also referenced to an automated transportation vehicle, refers to a transportation vehicle which is equipped with an electromagnetic or optical automated guiding device and capable of traveling along a given guide path, and has safety protection and various transportation functions.

At present, the AGV may be generally applied to the logistics storage industry. For example, articles such as stocking shelves, commodities and the like can be transported by the AGV. When it is required to transport articles such as a stocking shelf, a commodity or the like by the AGV, the AGV typically moves along a guide path planned on the ground. When the AGV moves to the bottom of the shelf, the commodity or the like, the AGV can lift the article and then transport the article.

SUMMARY

Various embodiments of the present disclosure provide an article transportation method is provided, comprising:

controlling an automated guided vehicle (AGV) to move to a bottom of a target article, the target article being an article to be transported;

determining an offset distance between a critical position of the AGV and a critical position of the target article;

controlling the AGV to perform position adjustment according to the offset distance until a central position of the AGV corresponds to a central position of the target article; and controlling the AGV to lift the target article at a current position and move the target article.

In some embodiments of the present disclosure, determining the offset distance between the critical position of the AGV and the critical position of the target article comprises:

scanning a pattern code of the target article through a camera, the pattern code of the target article disposed at the critical position of the target article, the camera disposed at the critical position of the AGV; and determining the offset distance according to a focal length of the camera, and a size of an image of the pattern code captured by the camera and an actual size of the pattern code.

In some embodiments of the present disclosure, determining the offset distance between the critical position of the AGV and the critical position of the target article comprises:

scanning a pattern code of the target article through a camera, the pattern code of the target article disposed at the critical position of the target article, the camera disposed at the critical position of the AGV; and determining the offset distance according to a focal length of the camera, a predetermined pixel point size and a pixel point size of an image of the scanned pattern code, the predetermined pixel point size configured to describe a length corresponding to each pixel point in the image captured by the camera.

In some embodiments of the present disclosure, controlling the AGV to perform position adjustment according to the offset distance until the central position of the AGV corresponds to the central position of the target article comprises:

determining an adjustment central point according to the offset distance when the offset distance is greater than a first predetermined distance threshold and less than a second predetermined distance threshold, the adjustment central point being a middle point between the critical position of the target article and the critical position of the AGV; and controlling the AGV to move in a circumferential movement fashion by taking the adjustment central point as a circle center until the central position of the AGV corresponds to the central position of the target article.

In some embodiments of the present disclosure, controlling the AGV to perform position adjustment according to the offset distance until the central position of the AGV corresponds to the central position of the target article comprises:

determining a movement distance between the AGV and a target place when the offset distance is greater than or equal to a second predetermined distance threshold, the target place being a place outside a position where the target article is located;

determining coordinates of the critical position of the AGV, coordinates of the critical position of the target article and coordinates of the target place respectively according to the offset distance and the movement distance;

determining a second adjustment path along which the AGV moves to the critical position of the target article according to the coordinates of the critical position of the AGV, the coordinates of the critical position of the target article and the coordinates of the target place; and controlling the AGV to move along the second adjustment path until the central position of the AGV corresponds to the central position of the target article.

In some embodiments of the present disclosure, determining the movement distance between the AGV and the target place comprises:

scanning a position of an edge position of the target article through a camera, the position of the edge of the target article corresponding to the position where the target place is located; and determining the movement distance according to a focal length of the camera, and a size of an image, captured by the camera, of the edge of the target article and an actual size of the edge of the target article.

In some embodiments of the present disclosure, upon controlling the AGV to lift the target article at the current position and move the target article, the method further comprises:

in the process of controlling the AGV to move the target article, generating an alarm when the offset distance is greater than a third predetermined distance threshold, the third predetermined distance threshold being greater than a first predetermined distance threshold and less than a second predetermined distance threshold.

Various embodiments of the present disclosure provide a terminal, comprising: a memory, a processor and a computer program that is stored in the memory and executable by the processor; wherein the computer program, when being executed by the processor, causes the processor to perform the method as described above.

Various embodiments of the present disclosure provide a computer-readable storage medium, in which a computer program is stored; the computer program, when being executed by a processor, causes the processor to perform the method as described above.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

FIG. 2C is a schematic view of determining a movement angle of the AGV according to an embodiment of the present disclosure;

FIG. 2D is a schematic view of an adjustment path according to an embodiment of the present disclosure;

FIG. 3 is a flowchart of a method of moving a target article according to an embodiment of the present disclosure;

DETAILED DESCRIPTION

The present disclosure will be described in further detail with reference to the accompanying drawings, to present the objects, technical solutions, and advantages of the present disclosure more clearly.

At present, since the AGV moves along the guide path that is pre-planned on the ground, the articles to be transported is required to be placed at designated positions. When there is a large quantity of articles to be transported, the workload is huge, and thus the efficiency of article transportation is low. In addition, during transporting the article by the AGV, other articles may be scratched due to unbalance load of the article, or the article may fall off from the AGV due to bumping in the transportation, such that the articles are damaged, and customer stickiness is lowered.

Prior to detailed interpretation and description of the embodiments of the present disclosure, terms, application scenarios and system architecture involved in the embodiments of the present disclosure are firstly interpreted.

First, the terms involved in the embodiments of the present disclosure are introduced hereinafter.

AGV

The AGV, abbreviation for Automated Guided Vehicle, refers to a transportation vehicle which is equipped with an electromagnetic or optical automated guiding device and capable of traveling along a given guide path, and has safety protection and various transportation functions.

Second, the application scenarios involved in the embodiments of the present disclosure are described.

The article transportation method according to the embodiments of the present disclosure can be applied to transportation of a shelf by an AGV. When the AGV transports the shelf, if the shelf is subjected to unbalance load on the AGV, the shelf may scratch other articles, such that the other articles or the shelf is damaged. In addition, the shelf may fall off from the AGV and thus be damaged. Therefore, before the AGV transports the shelf, an offset distance between a critical position of the AGV and a critical position of the shelf may be first detected, and the position of the AGV may be adjusted when the offset distance is greater than or equal to a distance threshold (a first predetermined distance threshold), such that a central position of the AGV corresponds to a central position of the shelf. Afterwards, the shelf is moved, such that unbalance load is prevented, and the probability that the shelf scratches the other articles or falls off from the AGV during transporting the shelf by the AGV. In this way, the stability of transporting the shelf by the AGV is improved, damages to the shelf are prevented, and customer stickiness is improved.

Finally, system architecture involved in the embodiments of the present disclosure is described.

Figure 1A:
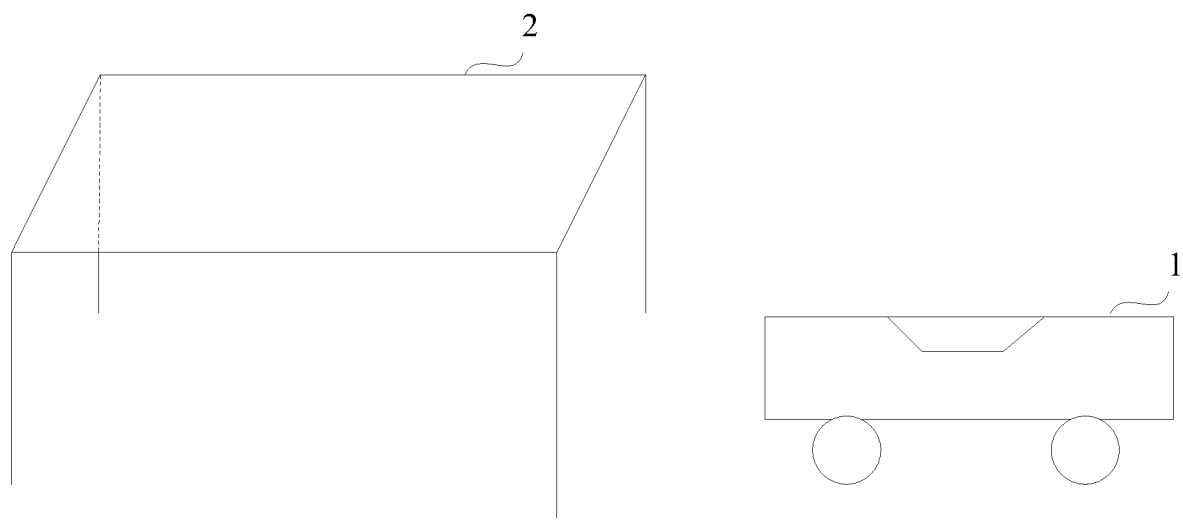
FIG. 1A is a schematic architectural view of an article transportation system according to an embodiment of the present disclosure.

FIG. 1A is a schematic architectural view of an article transportation system according to an embodiment of the present disclosure. Referring to FIG. 1A, the system comprises an AGV 1 and a target article 2. The AGV 1 is capable of detecting an offset distance between a critical position of the AGV 1 and a critical position of the target article 2, and controlling the AVG 1 to perform position adjustment according to the offset distance until a central position of the AGV corresponds to a central position of the target article, such that the target article 2 is stably transported by the AGV 1.

Figure 1B:
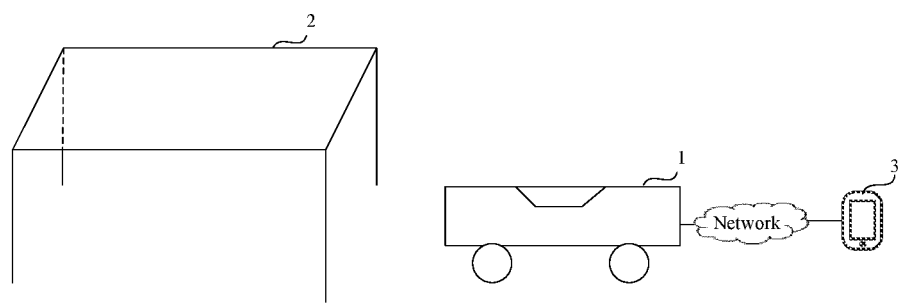
FIG. 1B is a schematic architectural view of an article transportation system according to another embodiment of the present disclosure.

It should be noted that the article transportation system may further comprise a terminal 3. Referring to FIG. 1B, the terminal 3 may communicate with the AGV 1, and when the AGV 1 detects the critical position of the target article 2, the AGV 1 can send the critical position of the AGV 1 and the critical position of the target article 2 to the terminal 3. The terminal 3 may determine the offset distance between the critical position of the AGV 1 and the critical position of the target article 2, and may control the AGV 1 to move according to the offset distance until the central position of the AGV 1 corresponds to the central position of the target article 2.

As known from the above, the embodiment of the present disclosure may be applicable to an AGV, or may be applicable to a terminal controlling the AGV. The AGV or the terminal can adjust a position of the AGV according to a critical position of the AGV and a critical position of a target article according to an offset distance between the critical position of the AGV and the critical position of the target article. Hereinafter, with reference to FIG. 2A, operations for adjusting the position of the AGV is described in detail. The position of the AGV can be adjusted by the following steps:

Step 201: An AGV is controlled to move to a bottom of a target article, wherein the target article is an article to be moved.

It should be noted that the AGV can move to the bottom of the target article according to a ground guide path, or can move to the bottom of the target article under control of a terminal. Specifically, the terminal can send a movement path to the AGV, and the AGV may move to the bottom of the target article according to the movement path upon receiving the movement path sent by the AGV.

Step 202: An offset distance between a critical position of the AGV and a critical position of the target article is determined.

It should be noted that the critical position of the AGV can be a position of any point on the AGV. For example, the critical position of the AGV may be a central position of the AGV, a forefront position of the AGV or the like; and the critical position of the target article may be any position at the bottom of the target article, for example, a central position, a position at a side or a corner or the like of the target article. It should be further noted that with respect to the critical position of the AGV and the critical position of the target article, it is required that the central position of the AGV coincides with the central position of the target article when the critical position of the AGV coincides with the critical position of the target article. That the central position of the AGV coincides with the central position of the target article means that the central position of the AGV coincides with the central position of the target article, or a distance between the central position of the AGV and the central position of the target article is within a tolerable deviation range. The tolerable deviation range refers to a maximum distance which can guarantee that no unbalance load occurs when the AGV lifts up the target article.

Since placement of the target article is random, when the AGV moves to the bottom of the target article, unbalance load may occur which results fall-off of the target article if the target article is moved in this case. Therefore, the AGV can first determine the offset distance between the critical position of the AGV and the critical position of the target article. The AGV can determine the offset distance by the following operations: scanning a pattern code of the target article through a camera, the pattern code of the target article disposed at the critical position of the target article, and the camera disposed at the critical position of the AGV; and determining the offset distance according to a focal length of the camera, an image size of the pattern code captured by the camera and an actual size of the pattern code.

The camera may be a camera carried by the AGV, or may be a camera independent of the AGV. When the camera is independent of the AGV, the camera can communicate with the AGV, that is, the camera can send a image comprising the pattern code captured by the camera and the focal length of the camera to the AGV. Upon receiving the image captured by the camera and the focal length of the camera, the AGV may determine the offset distance according to the focal length of the camera, and the image size of the pattern code captured by the camera and the actual size of the pattern code.

In addition, since the AGV may move under control of the terminal, the camera can further send the captured image comprising the pattern code and the focal length of the camera to the terminal, such that the terminal can determine the offset distance according to the focal length of the camera, and the image size of the pattern code captured by the camera and the actual size of the pattern code.

Exemplarily, the image size of the captured pattern code can refer to a width or a length of the captured image of the pattern code, and the actual size of the pattern code may refer to an actual width or an actual length of the pattern code. Accordingly, the AGV or the terminal can determine the offset distance according to the width of the image of the captured pattern code, the actual width of the pattern code, and the focal length of the camera through the following calculation model:

$$d = \frac{f * H}{h}$$

In this calculation model, d denotes the offset distance, f denotes the focal length of the camera, H denotes the actual width of the pattern code, and h denotes the width of the captured image of the pattern code.

In some embodiments of the present disclosure, in the above calculation model, the actual width of the pattern code may be replaced by the actual length of the pattern code, and correspondingly, the width of the captured image of the pattern code may be replaced by the length of the captured image of the pattern code.

It should be noted that the actual size of the pattern code may be stored in the AGV or the terminal in advance, and the pattern code may be a two-dimensional code, a barcode or the like.

It should be noted that in the embodiment of the present disclosure, the offset distance may be determined not only in the above way, but also in other ways. For example, in one possible implementation, the pattern code of the target article can be scanned through the camera; and when the pattern code of the target article is successfully scanned, the offset distance can be determined according to the focal length of the camera, a predetermined pixel point size and a pixel point size of the captured image of the pattern code.

It should be noted that the predetermined pixel point size is intended to describe a length corresponding to each pixel point in the image captured by the camera, and the predetermined pixel point size may be predefined. For example, the predetermined pixel point size may be 1 cm, 2 cm, 3 cm or the like.

When the pattern code of the target article is scanned by the camera, a position of the pattern code in the captured whole image can be determined, and then a height between the pattern code and the ground may be determined according to the predetermined pixel point size and the pixel point size of the image of the pattern code; and a shooting angle of the camera can be determined according to the focal length of the camera, and the offset distance can be determined according to the height between the pattern code and the ground and the shooting angle of the camera.

In some embodiments of the present disclosure, the terminal or the AGV may pre-store a corresponding relationship between the image size of the pattern code and the offset distance. When the camera scans the pattern code of the target article, the image size of the pattern code of the target article may be firstly determined, and then a corresponding offset distance may be acquired according to the corresponding relationship between the image size of the pattern code and the offset distance, and the acquired offset distance can be determined as the offset distance between the critical position of the AGV and the critical position of the target article.

In some embodiments of the present disclosure, a laser reflection plate may be disposed at the critical position of the target article. The AGV may emit a laser beam through a laser scanner, acquire the laser beam reflected by the laser reflection plate, and determine the offset distance according to a time when the laser beam is emitted and a time when the reflected laser beam is acquired. Alternatively, the AGV may send the time when the laser beam is emitted and the time when the reflected laser beam is received to the terminal, such that the terminal determines the offset distance. Exemplarily, the AGV or the terminal may determine a time duration between the time when the laser beam is emitted and the time when the reflected laser beam is received, determine an optical length of the laser beam according to the time duration and the speed of the laser beam, and determine a half of the determined optical length as the offset distance.

Step 203: The AGV is controlled to perform position adjustment according to the offset distance until a central position of the AGV corresponds to a central position of the target article.

When the AGV or the terminal controls the AGV to perform position adjustment according to the offset distance, the offset distance may be compared with a first predetermined distance threshold and a second predetermined distance threshold. That is, the AGV or the terminal can judge whether the offset distance is greater than the first predetermined distance threshold and less than the second predetermined distance threshold. When judging whether the offset distance is greater than the first predetermined distance threshold and less than the second predetermined distance threshold, the following three occasions may occur.

In a first occasion, when the offset distance is greater than the first predetermined distance threshold and less than the second predetermined distance threshold, it indicates that the critical position of the AGV is proximal to the critical position of the target article, and the AGV only needs to be controlled to perform fine position adjustment at the bottom of the target article. Exemplarily, the terminal or the AGV may determine an adjustment central point according to the offset distance, wherein the adjustment central point is a middle point between the critical position of the target article and the critical position of the AGV; and the AGV may be controlled to move in a circumferential movement fashion by taking the adjustment central point as a circle center until the central position of the AGV corresponds to the central position of the target article.

It should be noted that the first predetermined distance threshold and the second predetermined distance threshold may be predefined, and in addition, the second predetermined distance threshold is greater than the first predetermined distance threshold. For example, the first predetermined distance threshold may be 3 cm, 4 cm or the like, and the second predetermined distance threshold may be 15 cm, 16 cm or the like.

The AGV or the terminal may determine the adjustment central point according to the offset distance through the following: establishing a Cartesian coordinate system by taking the critical position of the AGV as an origin and by taking a straight line connecting the critical position of the AGV to the critical position of the target article as an ordinate or an abscissa, then determining coordinates of the critical position of the target article in the Cartesian coordinate system according to the offset distance, and finally determining the adjustment central point according to the coordinates of the critical position of the AGV and the coordinates of the critical position of the target article.

Figure 2A:
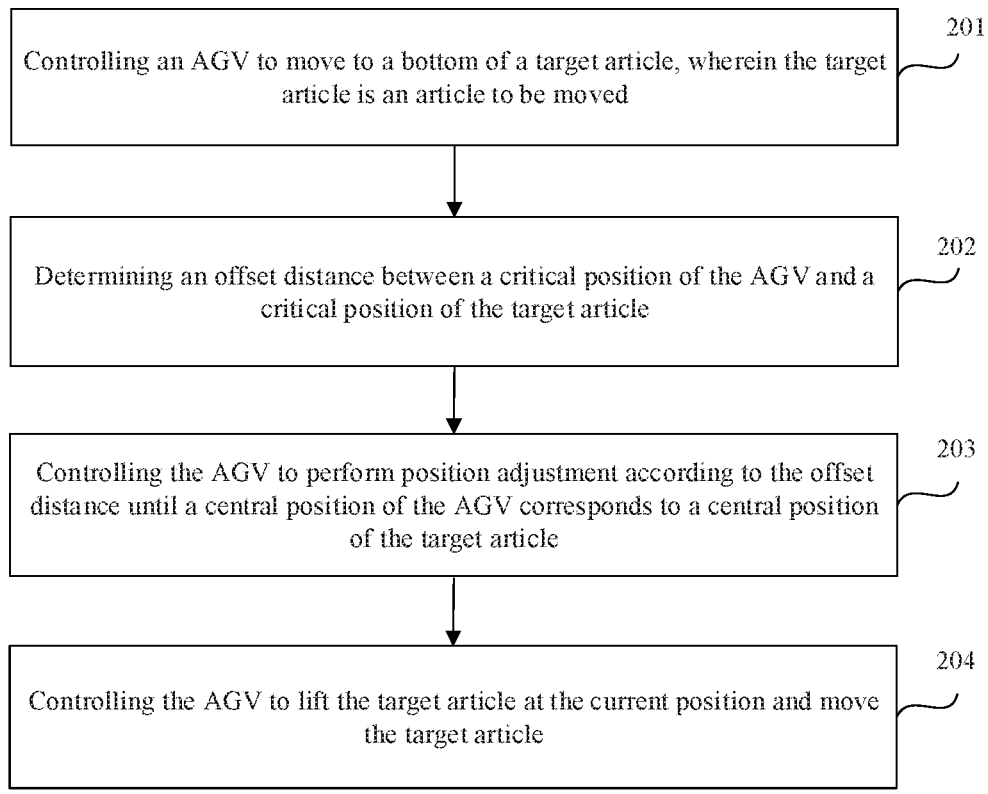
FIG. 2A is a flowchart of an article transportation method according to an embodiment of the present disclosure.
Figure 2B:
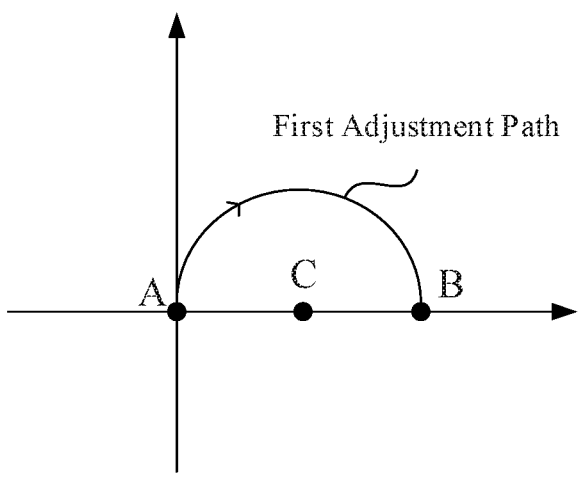
FIG. 2B is a schematic view illustrating circumferential movement of an AGV according to an embodiment of the present disclosure.

For example, when the critical position of the AGV is the central position of the AGV, the critical position of the target article is the central position of the target article, and the offset distance is 10 cm, referring to FIG. 2B, the Cartesian coordinate system is established by taking the central position A of the AGV as an origin and by taking the straight line connecting the central position A of the AGV to the central position B of the target article as the ordinate, then the coordinates of the central position B of the target article in the Cartesian coordinate system are determined as (10, 0) according to the offset distance 10 cm, and finally, the coordinates of the adjustment central point C are determined as (5, 0) according to the coordinates of the central position A of the AGV and the coordinates of the central position B of the target article.

It should be noted that in the embodiment of the present disclosure, the coordinate system may be established by taking the critical position of the AGV as the origin, and in addition, the coordinate system may be established by taking the critical position of the target article as the origin. Nevertheless, the coordinate system may be established by taking another position as the origin. Further, in the embodiment of the present disclosure, the Cartesian coordinate system is taken as an example for description, which sets no limitation to the embodiments of the present disclosure. In practice, other coordinate systems may further be established, for example, a polar coordinate system or the like.

In addition, the AGV or the terminal may control the AGV to move circumferentially with ½ of the offset distance as a radius by taking the adjustment central point as a circle center, wherein the circumferential movement of the AGV may by a clockwise circumferential movement or a counterclockwise circumferential movement.

For example, referring to FIG. 2B, the AGV controls the AGV to make clockwise circumferential movement by taking the adjustment central point (5, 0) as the circle center and taking the central position of the AGV as a starting point.

It should be noted that in the embodiment of the present disclosure, the adjustment central point may be determined not only in the above way, but also in another way. For example, the AGV or the terminal may establish a Cartesian coordinate system by taking the straight line connecting the critical position of the AGV to the critical position of the target article as the ordinate or the abscissa and by taking the critical position of the AGV as the origin, determine a position point, on the straight line connecting the critical position of the AGV to the critical position of the target article, which is ½ the offset distance distal from the critical position of the AGV, determine the position point as the adjustment central point, and determine the coordinates of the adjustment central point according to the coordinates of the critical position of the AGV and the ½ of the offset distance. That is, in this implementation, the AGV or the terminal can determine the adjustment central point just according to the coordinates of the critical position of the AGV and the offset distance, without determining the coordinates of the critical position of the target article.

In a second occasion, when the offset distance is greater than or equal to the second predetermined distance threshold, it indicates that the central position of the AGV is far away from the central position of the target article. If the position of the AGV is adjusted at the bottom of the target article, it is probable that the target article will be collided during the adjustment, such that the target article is damaged. Therefore, when the offset distance is greater than or equal to the second predetermined distance threshold, the AGV may firstly move away from the bottom of the target article, and then position adjustment is performed. Optionally, the position of the AGV may be adjusted by the following steps:

Step A: A movement distance between the AGV and a target place is determined, wherein the target place is a place outside a position where the target article is located.

In some embodiments of the present disclosure, a position of an edge of the target article is scanned by the camera, wherein the position of the edge of the target article corresponding to the position where the target place is located; and the movement distance is determined according to the focal length of the camera, a size of an image of the edge of the target article captured by the camera, and an actual size of the edge of the target article. That the position of the edge of the target article corresponds to the position where the target place is located means that the position of the edge of the target article is taken as the position where the target place is located.

It should be noted that during controlling the AGV to move away from the bottom of the target article, it may be generally considered that the AGV moves away from the bottom of the target article when the critical position of the AGV reaches the edge of the target article. Therefore, the actual size of the edge of the target article may be pre-stored in the AGV or the terminal, such that whether the AGV moves away from the bottom of the target article can be judged according to the actual size of the edge of the target article. Nevertheless, in practice, whether the AGV moves away from the bottom of the target article may be judged by taking any object outside the position where the target article is located as a reference.

In another possible implementation, a predetermined return distance may be pre-stored in the terminal or the AGV, wherein the predetermined return distance is a distance by which the AGV is controlled to move away from the bottom of the target article. The predetermined return distance may be 50 cm, 20 cm, half of the length of the AGV or the like. The stored predetermined return distance needs to ensure that the AGV is capable of moving away from the bottom of the target article. When the AGV is at the bottom of the target article, it is probable that the AGV fails to scan the edge of the target article through the camera. In this case, the stored predetermined return distance may be acquired, and the predetermined return distance may be determined as the movement distance between the AGV and the target place.

By directly determining the predetermined return distance as the movement distance, the terminal or the AGV only determines a distance between the AGV to the target place, however, a specific direction of the target place is not determined, that is, a movement direction of the AGV is not determined. Therefore, the terminal or the AGV needs to further determine, according to the movement distance, the direction in which the AGV is controlled to move. The terminal or the AGV may directly determine the direction in which the AGV moves as a direction in which the AGV returns. Nevertheless, in practice, according to a length and a width of the target article, and the width of the AGV and the offset distance, the terminal or the AGV may determine a movement angle of the AGV, that is, control the direction in which the AGV moves.

FIG. 2C is a schematic view which illustrates determining the movement angle of the AGV according to the length and the width of the target article, and the width of the AGV according to an embodiment of the present disclosure. As illustrated in FIG. 2C, a black bold solid-line block represents a profile of the AGV, and a dashed-line block represents the target article. Assuming that the length of the target article is L, the width thereof is W1, the width of the AGV is W2, and the offset distance is d, then as known from the illustrated geometric relationship, the movement angle θ of the AGV may be determined through the following calculation model:

$$\theta = \arctan\left(\frac{a}{W_1 \frac{1}{2}}\right)$$

$$a + b = \frac{L}{2}$$

$$\left(\frac{a}{W_1 \frac{1}{2}}\right)^2 = \frac{(b+d)^2 - \left(W_2 \frac{2}{2}\right)^2}{\left(W_2 \frac{2}{2}\right)^2}$$

In the above calculation model, θ denotes the movement angle of the AGV, $W_1$ denotes the width of the target article, L denotes the length of the target article, $W_2$ denotes the width of the AGV, and d denotes the movement distance.

In addition, in the embodiment of the present disclosure, the movement distance may be determined not only in the above way, but also in other ways. For example, a laser reflection plate is disposed at the position of the edge of the target article. The AGV may emit a laser beam through a laser scanner, acquire the laser beam reflected by the laser reflection plate, and determine the movement distance according to a time when the laser beam is emitted and a time when the reflected laser beam is acquired. Alternatively, the AGV may send the time when the laser beam is emitted and the time when the reflected laser beam is received to the terminal, such that the terminal determines the movement distance. For implementation of determining the movement distance according to the time when the laser beam is emitted and the time when the reflected laser beam is acquired, reference may be made to the relevant implementation for determining the offset distance, which is not described herein any further.

Step B: Coordinates of the critical position of the AGV, coordinates of the critical position of the target article and coordinates of the target place are determined respectively according to the offset distance and the movement distance;

The AGV or the terminal may establish a Cartesian coordinate system by taking the critical position of the AGV as the origin and by taking the straight line connecting the critical position of the AGV and the critical position of the target article as the ordinate or the abscissa, then determine the coordinates of the critical position of the target article in the Cartesian coordinate system according to the offset distance, and finally determine the coordinates of the target place in the Cartesian coordinate system according to the movement distance.

For example, when the critical position of the AGV is the central position of the AGV, the critical position of the target article is the central position of the target article, the offset distance is 20 cm, and the movement distance is 20 cm, referring to FIG. 2D, the Cartesian coordinate system is established by taking the central position A of the AGV as the origin and by taking the straight line connecting the central position A of the AGV to the central position B of the target article as the ordinate, then the coordinates of the central position B of the target article in the Cartesian coordinate system are determined as (20, 0) according to the offset distance 20 cm, and finally, the coordinates of the target place D in the Cartesian coordinate system are determined as (0, −20) according to the movement distance 20 cm.

It should be noted that in the embodiment of the present disclosure, the coordinate system may be established by taking the critical position of the AGV as the origin, and in addition, the coordinate system may be established by taking the critical position of the target article as the origin, or the coordinate system may be established taking the position where the target place is located as the origin. Nevertheless, the coordinate system may be established by taking another position as the origin. Further, in the embodiment of the present disclosure, the Cartesian coordinate system is taken as an example for description, which sets no limitation to the embodiments of the present disclosure. In practice, other coordinate systems may also be established, for example, a polar coordinate system or the like.

Step C: A second adjustment path along which the AGV moves to the critical position of the target article is determined according to the coordinates of the critical position of the AGV, the coordinates of the critical position of the target article and the coordinates of the target place.

The second adjustment path may be formed by two segments of straight paths. These two segments of straight paths are respectively a straight path from the critical position of the AGV to the target place, and a straight path from the target place to the critical position of the target article. Nevertheless, in practice, the second adjustment path may also be formed by two segments of curved paths. However, since the straight path saves the time most, and a support frame of the target article may not be touched, the second adjustment path is typically formed by two segments of straight paths.

Step D: The AGV is controlled to move along the second adjustment path until the central position of the AGV corresponds to the central position of the target article.

For example, referring to FIG. 2D, since the central position of the AGV also corresponds to the central position of the target article when the critical position of the AGV corresponds to the critical position of the target article, the AGV may be controlled to move along the second adjustment path from the current position to the position where the target place is located, and then move from the position where the target place is located to the critical position of the target article.

In a third occasion, when the offset distance is less than or equal to the first predetermined distance threshold, since in this case, the offset distance between the critical position of the AGV and the critical position of the target article is very small, the offset distance between the central position of the AGV and the central position of the target article is also very small. Under such circumstance, when the AGV transports the target article, almost no unbalance load occurs. Therefore, when the offset distance is less than or equal to the first predetermined distance threshold, the AGV may not be controlled to perform position adjustment.

Step 204: The AGV is controlled to lift the target article at the current position and move the target article.

Since the critical position of the AGV is adjusted to correspond to the critical position of the target article, the central position of the AGV also corresponds to the central position of the target article. Under such circumstance, when the AGV lifts the target article at the current position, the probability that unbalance load occurs to the target article is lowered. In this way, when the AGV moves the target article, the probability that the target article fall off from the AGV is also lowered. The current position is the position of the AGV after the position of the AGV is adjusted according to the above steps.

In the embodiment of the present disclosure, for the sake of increasing the stability of transporting the target article when the AGV moves the target article, the offset distance between the critical position of the AGV and the critical position of the target article may be determined, and the adjustment path may be planned for the AGV according to the offset distance, such that the AGV may be controlled to perform position adjustment according to the adjustment path until the central position of the AGV corresponds to the central position of the target article. In this way, when the AGV moves the target article subsequently, the probability that the target article falls off the AGV may be lowered, and in addition, scratches due to unbalance load can be prevented, and customer stickiness may be improved.

In the embodiment of the present disclosure, bumping may occur when the AGV moves the target article. For preventing the target article from falling off from the AGV due to the bumping, the AGV may need to be controlled to perform some position adjustment operations. Hereinafter, referring to FIG. 3, the operations of moving the target article by the AGV are described, and the operations may specifically comprise the following steps:

Step 301: During a process of controlling the AGV to move the target article, whether the offset distance between the critical position of the AGV and the critical position of the target article is greater than a third predetermined distance threshold is judged. The third predetermined distance threshold is greater than the first predetermined threshold and less than the second predetermined distance threshold.

During the process of controlling the AGV to move the target article, due to uneven ground or other reasons, the target article may be subjected to bumping on the AGV, and as a result the offset distance between the central position of the AGV and the central position of the target article may be changed. Consequently, the target article may fall off from the AGV, and thus the target article may be damaged. Therefore, for avoidance of the above situation, during the process of controlling the AGV to move the target article, the offset distance between the critical position of the AGV and the critical position of the target article can be likewise detected, and whether the offset distance is greater than the third predetermined distance threshold can be judged.

It should be noted that during the process of controlling the AGV to move the target article, the offset distance can be detected in real time, and whether the offset distance is greater than the third predetermined distance threshold can be judged; or the offset distance can be detected at a specified time interval, and whether the offset distance is greater than the third predetermined distance threshold may be judged. The specified time interval may be predefined. For example, the specified time interval may be 5 seconds, 10 seconds, 15 seconds or the like.

In addition, when the AGV initially lifts the target article, the first predetermined distance threshold is generally defined to be relatively small to prevent the unbalance load during transportation of the target article. However, during the process of moving the target article by the AGV, since the bumping may occur, a safety range for the transportation can be suitably widened. That is, the third predetermined distance threshold may be predefined, such that the third predetermined distance threshold is greater than the first predetermined distance threshold and less than the second predetermined distance threshold. For example, the third predetermined distance threshold may be 6 cm, 7 cm, 8 cm or the like.

Step 302: An alarm is generated when the offset distance is greater than the third predetermined distance threshold.

When the offset distance is greater than the third predetermined distance threshold, the AGV may be controlled to generate an alarm sound. Nevertheless, for preventing the target article from falling off from the AGV, the AGV may be controlled to timely cease transporting the target article, and the operations in step 202 and step 203 are performed again to re-adjust the position of the AGV.

In addition, when the offset distance is less than or equal to the third predetermined distance threshold, the AGV may be controlled to continue to move the target article.

In the embodiment of the present disclosure, during the process of controlling the AGV to move the target article, for preventing the target article from falling off from the AGV due to factors such as bumping or the like, an alarm may be timely generated when it is determined that the offset distance is greater than the third predetermined distance threshold, such that the target article is protected in time, the probability that the target article is damaged is lowered, and customer stickiness is improved.

Figure 4A:
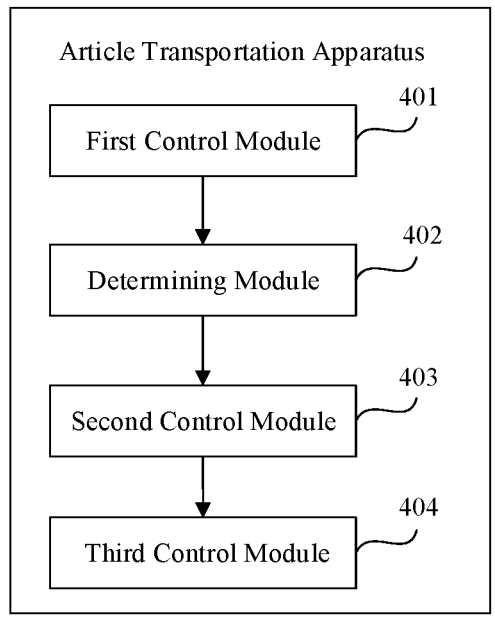
FIG. 4A is a schematic structural view of an article transportation apparatus according to an embodiment of the present disclosure.

FIG. 4A is a block view of an article transportation apparatus according to an embodiment of the present disclosure. Referring to FIG. 4A, the apparatus can be implemented by software, hardware or a combination thereof. The article transportation apparatus comprises: a first control module 401, a determining module 402, a second control module 403 and a third control module 404.

The first control module 401 is configured to control an AGV to move to a bottom of a target article, the target article being an article to be moved.

The determining module 402 is configured to determine an offset distance between a critical position of the AGV and a critical position of the target article.

The second control module 403 is configured to control the AGV to perform position adjustment according to the offset distance until a central position of the AGV corresponds to a central position of the target article.

The third control module 404 is configured to control the AGV to lift the target article at a current position and move the target article.

Figure 4B:
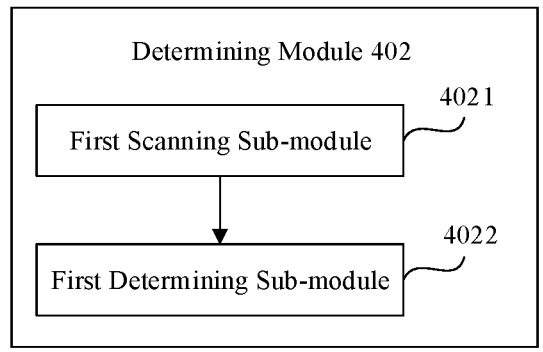
FIG. 4B is a schematic structural view of a determining module according to an embodiment of the present disclosure.

In some embodiments of the present disclosure, referring to FIG. 4B, the determining module 402 comprises:

a first scanning sub-module 4021, configured to scan a pattern code of the target article through a camera, the pattern code of the target article disposed at the critical position of the target article, and the camera disposed at the critical position of the AGV; and a first determining sub-module 4022, configured to determine the offset distance according to a focal length of the camera, and a size of image captured by the camera and an actual size of the pattern code.

Figure 4C:
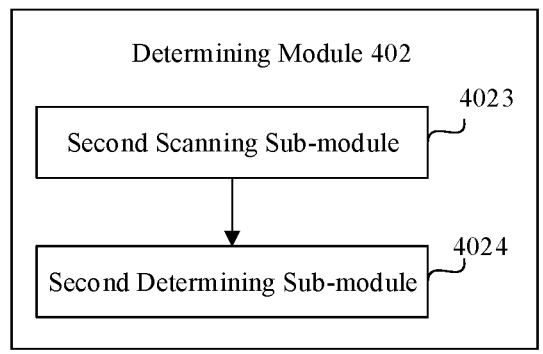
FIG. 4C is a schematic structural view of a determining module according to another embodiment of the present disclosure.

In some embodiments of the present disclosure, referring to FIG. 4C, the determining module 402 comprises:

a second scanning sub-module 4023, configured to scan a pattern code of the target article through a camera, the pattern code of the target article disposed at the critical position of the target article, and the camera disposed at the critical position of the AGV; and a second determining sub-module 4024, configured to determine the offset distance according to the focal length, a predetermined pixel point size and a pixel point size of image of the scanned pattern code, the pixel point size of image of the scanned pattern code configured to describe a length corresponding to each pixel point in the image captured by the camera.

Figure 4D:
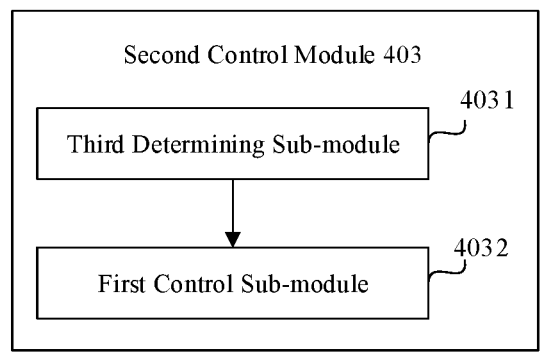
FIG. 4D is a schematic structural view of a second control module according to an embodiment of the present disclosure.

In some embodiments of the present disclosure, referring to FIG. 4D, the second control module 403 comprises:

a third determining sub-module 4031, configured to, when the offset distance is greater than a first predetermined distance threshold and less than a second predetermined distance threshold, determine an adjustment central point according to the offset distance, the adjustment central point being a middle point between the critical position of the target article and the critical position of the AGV; and a first control sub-module 4032, configured to, control the AGV to move in a circumferential movement fashion by taking the adjustment center point as a circle center until the central position of the AGV corresponds to the central position of the target article.

Figure 4E:
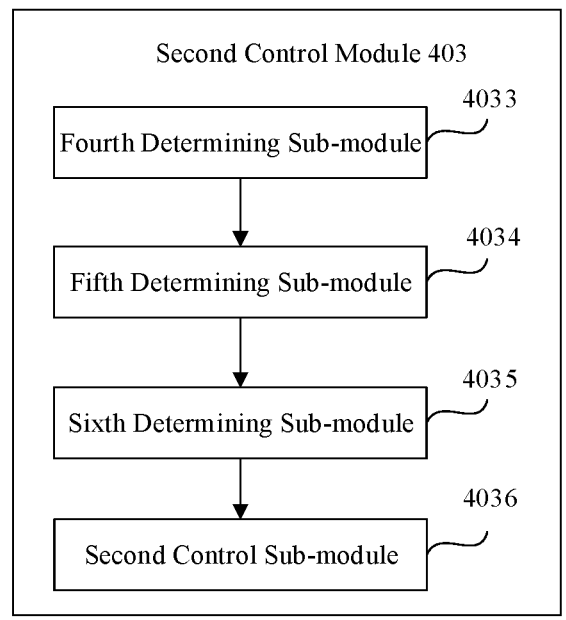
FIG. 4E is a schematic structural view of a second control module according to another embodiment of the present disclosure.

In some embodiments of the present disclosure, referring to FIG. 4E, the second control module 403 comprises:

a fourth determining sub-module 4033, configured to, when the offset distance is greater than or equal to a second predetermined distance threshold, determine a movement distance between the AGV and a target place, the target place being a place outside a position where the target article is located;

a fifth determining sub-module 4034, configured to determine coordinates of the critical position of the AGV, coordinates of the critical position of the target article and coordinates of the target place respectively according to the offset distance and the movement distance;

a sixth determining sub-module 4035, configured to determine a second adjustment path along which the AGV moves to the critical position of the target article according to the coordinates of the critical position of the AGV, the coordinates of the critical position of the target article and the coordinates of the target place; and a second control sub-module 4036, configured to control the AGV to move along the second adjustment path until the central position of the AGV corresponds to the central position of the target article.

In some embodiments of the present disclosure, the fourth determining sub-module 4033 is configured to:

scan an edge position of the target article by a camera, the edge position of the target article corresponding to the position where the target place is located; and determine the movement distance according to a focal length of the camera, and an image size and an actual size of the edge of the target article captured by the camera.

Figure 4F:
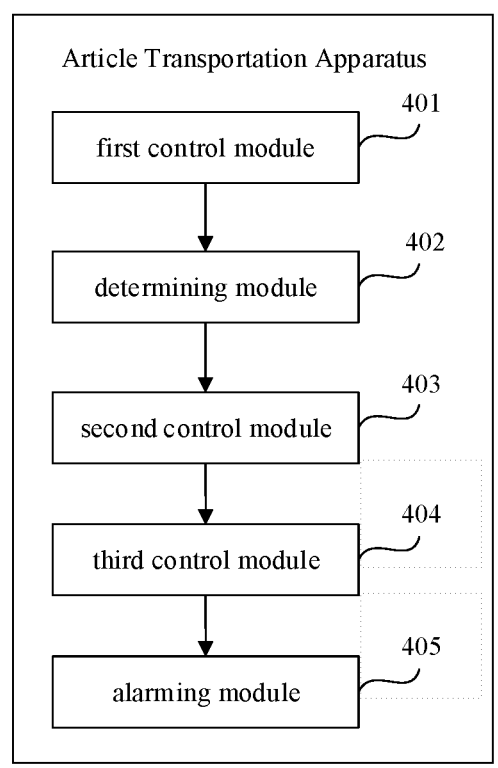
FIG. 4F is a schematic structural view of an article transportation apparatus according to another embodiment of the present disclosure.

In some embodiments of the present disclosure, referring to FIG. 4F, the apparatus further comprises:

an alarming module 405, configured to, in the process of controlling the AGV to move the target article, generate an alarm when the offset distance is greater than a third predetermined distance threshold, the third predetermined distance threshold being greater than a first predetermined distance threshold and less than a second predetermined distance threshold.

In the embodiment of the present disclosure, for the sake of increasing the stability of transporting the target article when the AGV moves the target article, the offset distance between the critical position of the AGV and the critical position of the target article can be determined, and the adjustment path can be planned for the AGV according to the offset distance, such that the AGV can be controlled to perform position adjustment according to the adjustment path until the central position of the AGV corresponds to the central position of the target article. In this way, when the AGV moves the target article subsequently, the probability that the target article falls off the AGV can be lowered, and in addition, scratches due to unbalance load may be prevented, and customer stickiness may be improved.

It should be noted that, during article transportation by the article transportation apparatus according to the above embodiment, the apparatus is described by only taking division of the above functional modules as examples. In practice, the functions can be assigned to different functional modules for implementation as required. That is, the internal structure of the apparatus can be divided into different functional modules to implement all or part of the above-described functions. In addition, the article transportation apparatus according to the above embodiment is based on the same inventive concept as the article transportation method according to the embodiment of the present disclosure, and the implementation is elaborated in the method embodiments, which is not be detailed herein any further.

Figure 5:
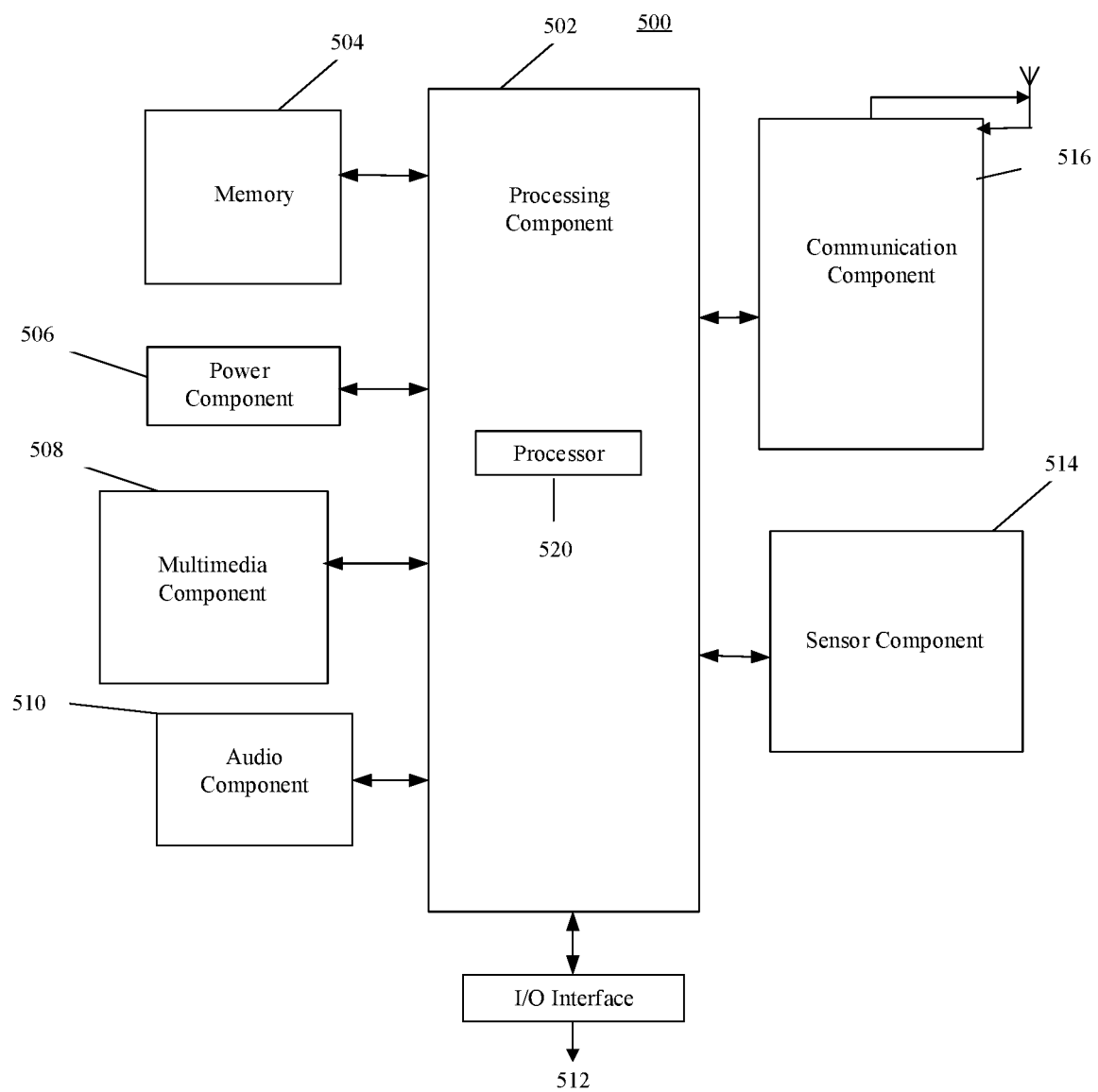
FIG. 5 is a schematic structural view of a terminal according to an embodiment of the present disclosure.

FIG. 5 is a block view of a terminal 500 according to an exemplary embodiment of the present disclosure. For example, the terminal 500 may be a mobile phone, a computer, a message transceiver device, a tablet device, a personal digital assistant or the like.

Referring to FIG. 5, the terminal 500 may comprise one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal 500, such as the operations associated with display, data communications, camera operations, and recording operations. The processing component 502 may comprise at least one processor 520 to execute instructions for performing all or a part of the steps in the above method. In addition, the processing component 502 may comprise one or more modules which facilitate the interaction between the processing component 502 and other components. For example, the processing component 502 may comprise a multimedia module to facilitate the interaction between the multimedia component 508 and the processing component 502.

The memory 504 is operable to store various types of data to support the operations of the terminal 500. Examples of such data comprise instructions for any application or method operated on the terminal 500, messages, pictures, videos and the like. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 provides power to various components of the terminal 500. The power component 506 may comprise a power management system, one or more power supplies, and other components associated with generation, management, and distribution of power source in the terminal 500.

The multimedia component 508 comprises a screen providing an output interface between the terminal 500 and a user. In some embodiments of the present disclosure, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and gestures on the touch panel. The touch sensors can not only sense a boundary of a touch or swipe action, but also sense a period of time and a pressure associated with the touch or swipe action. In some embodiments of the present disclosure, the multimedia component 508 comprises a front camera and/or a rear camera. The front camera and/or the rear camera can receive external multimedia data when the terminal 500 is in an operation mode, such as a shooting mode or a video mode. Each of the front camera and the rear camera may be a fixed optical lens system or have focus and optical zoom capability.

The audio component 510 is operable to output and/or input audio signals. For example, the audio component 510 comprises a microphone (MIC) configured to receive an external audio signal when the terminal 500 is in an operation mode, such as a recording mode, or a voice recognition mode. The received audio signal may be further stored in the memory 504 or transmitted via the communication component 516. In some embodiments of the present disclosure, the audio component 510 further comprises a speaker to output audio signals.

The I/O interface 512 provides an interface between the processing component 502 and a peripheral interface module, such as a keyboard, a click wheel, a button or the like. The buttons may comprise, but not limited to, a home button, a volume button, a starting button, and a locking button.

The sensor component 514 comprises one or more sensors to provide status assessments of various aspects of the terminal 500. For example, the sensor component 514 may detect an ON/OFF status of the terminal 500, relative positioning of components, e.g., the display and the keypad, of the terminal 500, a change in position of the terminal 500 or a component of the terminal 500, a presence or absence of user in contact with the terminal 500, an orientation or an acceleration/deceleration of the terminal 500, and a change in temperature of the terminal 500. The sensor component 514 may comprise a proximity sensor operable to detect the presence of nearby objects without any physical contact. The sensor component 514 may also comprise a light sensor, such as a CMOS or CCD image sensor, for imaging applications. In some embodiments of the present disclosure, the sensor component 514 may also comprise an accelerometer sensor, a gyroscope sensor, a magnetic sensor, a pressure sensor, or a temperature sensor.

The communication component 516 is operable to facilitate wired or wireless communications between the terminal 500 and other devices. The terminal 500 may access a wireless network based on a communication standard, such as WiFi, 2G, 3G, 4G or a combination thereof. In one exemplary embodiment, the communication component 516 receives a broadcast signal or broadcast associated information from an external broadcast management system over a broadcast channel. In one exemplary embodiment, the communication component 516 further comprises a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments of the present disclosure, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method according to the embodiment as illustrated in FIG. 2A or FIG. 3.

Various embodiments of the present disclosure further provide a non-transitory computer-readable storage medium storing instructions, for example, the memory 504 comprising instructions. The instructions, when being executed by the processor 520 of the terminal 500, may cause the processor 520 to perform the above method. For example, the non-transitory computer-readable storage medium may be a read-only memory (ROM), a random access memory (RAM), a compact disc ROM (CD-ROM), a magnetic tape, a floppy disk, an optical data storage device or the like.

Various embodiments of the present disclosure provide a non-transitory computer-readable storage medium storing instructions is further provided. The instructions in the storage medium, when being executed by a processor of the AGV, may cause the terminal to perform the method according to the embodiment as illustrated in FIG. 2A or FIG. 3.

Various embodiments of the present disclosure provide a computer program product. The computer program product stores instructions. The instructions, when being executed on the terminal or the AGV, may cause the terminal or the AGV to perform the article transportation method according to the above embodiments.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. An article transportation method, comprising:
controlling an automated guided vehicle (AGV) to move to a bottom of a target article, the target article being an article to be moved;
determining an offset distance between a critical position of the AGV and a critical position of the target article;
controlling the AGV to perform position adjustment according to the offset distance until a central position of the AGV corresponds to a central position of the target article; and
controlling the AGV to lift the target article at a current position and move the target article,
wherein controlling the AGV to perform position adjustment according to the offset distance until the central position of the AGV corresponds to the central position of the target article comprises:
determining a movement distance between the AGV and a target place when the offset distance is greater than or equal to a second predetermined distance threshold, the target place being a place outside a position where the target article is located;
determining coordinates of the critical position of the AGV, coordinates of the critical position of the target article and coordinates of the target place respectively according to the offset distance and the movement distance;
determining a second adjustment path along which the AGV moves to the critical position of the target article according to the coordinates of the critical position of the AGV, the coordinates of the critical position of the target article and the coordinates of the target place; and
controlling the AGV to move along the second adjustment path until the central position of the AGV corresponds to the central position of the target article.

2. The method according to claim 1, wherein determining the offset distance between the critical position of the AGV and the critical position of the target article comprises:
scanning a pattern code of the target article through a camera, the pattern code of the target article disposed at the critical position of the target article, and the camera disposed at the critical position of the AGV; and
determining the offset distance according to a focal length of the camera, and a size of an image of the pattern code captured by the camera and an actual size of the pattern code.

3. The method according to claim 1, wherein determining the offset distance between the critical position of the AGV and the critical position of the target article comprises:
scanning a pattern code of the target article through a camera, the pattern code of the target article disposed at the critical position of the target article, and the camera disposed at the critical position of the AGV; and
determining the offset distance according to a focal length of the camera, a predetermined pixel point size and a pixel point size of an image of the scanned pattern code, the predetermined pixel point size configured to describe a length corresponding to each pixel point in the image captured by the camera.

4. The method according to claim 1, wherein controlling the AGV to perform position adjustment according to the offset distance until the central position of the AGV corresponds to the central position of the target article comprises:
determining an adjustment central point according to the offset distance when the offset distance is greater than a first predetermined distance threshold and less than the second predetermined distance threshold, the adjustment central point being a middle point between the critical position of the target article and the critical position of the AGV; and
controlling the AGV to move in a circumferential movement fashion by taking the adjustment central point as a circle center until the central position of the AGV corresponds to the central position of the target article.

5. The method according to claim 1, wherein determining the movement distance between the AGV and the target place comprises:

scanning a position of an edge of the target article through a camera, the position of the edge of the target article corresponding to the position where the target place is located; and determining the movement distance according to a focal length of the camera, and a size of an image, captured by the camera, of the edge of the target article and an actual size of the edge of the target article.

6. The method according to claim 1, wherein upon controlling the AGV to lift the target article at the current position and move the target article, the method further comprises:

in the process of controlling the AGV to move the target article, generating an alarm when the offset distance is greater than a third predetermined distance threshold, the third predetermined distance threshold being greater than a first predetermined distance threshold and less than the second predetermined distance threshold.

7. A terminal, comprising:

a memory, a processor and a computer program that is stored in the memory and executable by the processor;

wherein when the computer program being executed by the processor, the processor is configured to:

control an automated guided vehicle (AGV) to move to a bottom of a target article, the target article being an article to be moved;

determine an offset distance between a critical position of the AGV and a critical position of the target article;

control the AGV to perform position adjustment according to the offset distance until a central position of the AGV corresponds to a central position of the target article; and control the AGV to lift the target article at a current position and move the target article, wherein, to control the AGV to perform position adjustment according to the offset distance until the central position of the AGV corresponds to the central position of the target article, the processor is further configured to:

determine a movement distance between the AGV and a target place when the offset distance is greater than or equal to a second predetermined distance threshold, the target place being a place outside a position where the target article is located;

determine coordinates of the critical position of the AGV, coordinates of the critical position of the target article and coordinates of the target place respectively according to the offset distance and the movement distance;

determine a second adjustment path along which the AGV moves to the critical position of the target article according to the coordinates of the critical position of the AGV, the coordinates of the critical position of the target article and the coordinates of the target place; and control the AGV to move along the second adjustment path until the central position of the AGV corresponds to the central position of the target article.

8. The terminal according to claim 7, wherein, when the processor is configured to determine the offset distance between the critical position of the AGV and the critical position of the target article, the processor is configured to:

scan a pattern code of the target article through a camera, the pattern code of the target article disposed at the critical position of the target article, and the camera disposed at the critical position of the AGV; and determine the offset distance according to a focal length of the camera, and a size of an image of the pattern code captured by the camera and an actual size of the pattern code.

9. The terminal according to claim 7, wherein, when the processor is configured to determine the offset distance between the critical position of the AGV and the critical position of the target article, the processor is configured to:

scan a pattern code of the target article through a camera, the pattern code of the target article disposed at the critical position of the target article, and the camera disposed at the critical position of the AGV; and determine the offset distance according to a focal length of the camera, a predetermined pixel point size and a pixel point size of an image of the scanned pattern code, the predetermined pixel point size configured to describe a length corresponding to each pixel point in the image captured by the camera.

10. The terminal according to claim 7, wherein, when the processor is configured to control the AGV to perform position adjustment according to the offset distance until the central position of the AGV corresponds to the central position of the target article, the processor is configured to:

determine an adjustment central point according to the offset distance when the offset distance is greater than a first predetermined distance threshold and less than the second predetermined distance threshold, the adjustment central point being a middle point between the critical position of the target article and the critical position of the AGV; and control the AGV to move in a circumferential movement fashion by taking the adjustment central point as a circle center until the central position of the AGV corresponds to the central position of the target article.

11. The terminal according to claim 7, wherein, when the processor is configured to determine the movement distance between the AGV and the target place, the processor is configured to:

scan a position of an edge of the target article through a camera, the position of the edge of the target article corresponding to the position where the target place is located; and determine the movement distance according to a focal length of the camera, and a size of an image, captured by the camera, of the edge of the target article, and an actual size of the edge of the target article.

12. The terminal according to claim 7, wherein, upon controlling the AGV to lift the target article at the current position and move the target article, the processor is further configured to:

in the process of controlling the AGV to move the target article, generate an alarm when the offset distance is greater than a third predetermined distance threshold, the third predetermined distance threshold being greater than a first predetermined distance threshold and less than the second predetermined distance threshold.

13. A non-transitory computer-readable storage medium, in which a computer program is stored; wherein the computer program when being executed by a processor causes the processor to:

control an automated guided vehicle (AGV) to move to a bottom of a target article, the target article being an article to be moved;

determine an offset distance between a critical position of the AGV and a critical position of the target article;

control the AGV to perform position adjustment according to the offset distance until a central position of the AGV corresponds to a central position of the target article; and
control the AGV to lift the target article at a current position and move the target article,
wherein to control the AGV to perform position adjustment according to the offset distance until the central position of the AGV corresponds to the central position of the target article, the processor is further caused to:
determine a movement distance between the AGV and a target place when the offset distance is greater than or equal to a second predetermined distance threshold, the target place being a place outside a position where the target article is located;
determine coordinates of the critical position of the AGV, coordinates of the critical position of the target article and coordinates of the target place respectively according to the offset distance and the movement distance;
determine a second adjustment path along which the AGV moves to the critical position of the target article according to the coordinates of the critical position of the AGV, the coordinates of the critical position of the target article and the coordinates of the target place; and
control the AGV to move along the second adjustment path until the central position of the AGV corresponds to the central position of the target article.

14. The non-transitory computer-readable storage medium according to claim 13, wherein the computer program when being executed by the processor causes the processor to:
scan a pattern code of the target article through a camera, the pattern code of the target article disposed at the critical position of the target article, and the camera disposed at the critical position of the AGV; and
determine the offset distance according to a focal length of the camera, and a size of an image of the pattern code captured by the camera and an actual size of the pattern code.

15. The non-transitory computer-readable storage medium according to claim 13, wherein when the computer program when being executed by the processor causes the processor to determine the offset distance between the critical position of the AGV and the critical position of the target article, the processor is caused to:
scan a pattern code of the target article through a camera of the camera, the pattern code of the target article disposed at the critical position of the target article, and the camera disposed at the critical position of the AGV; and
determine the offset distance according to a focal length, a predetermined pixel point size and a pixel point size of an image of the scanned pattern code, the predetermined pixel point size configured to describe a length corresponding to each pixel point in the image captured by the camera.

16. The non-transitory computer-readable storage medium according to claim 13, wherein when the computer program when being executed by the processor causes the processor to control the AGV to perform position adjustment according to the offset distance until the central position of the AGV corresponds to the central position of the target article, the processor is caused to:
determine an adjustment central point according to the offset distance when the offset distance is greater than a first predetermined distance threshold and less than the second predetermined distance threshold, the adjustment central point being a middle point between the critical position of the target article and the critical position of the AGV; and
control the AGV to move in a circumferential movement fashion by taking the adjustment central point as a circle center until the central position of the AGV corresponds to the central position of the target article.

17. The non-transitory computer-readable storage medium according to claim 13, wherein when the computer program when being executed by the processor causes the processor to determine the movement distance between the AGV and the target place, the processor is caused to:
scan a position of an edge of the target article through a camera, the position of the edge of the target article corresponding to the position where the target place is located; and
determine the movement distance according to a focal length of the camera, and a size of an image, captured by the camera, of the edge of the target article and an actual size of the edge of the target article.

* * * * *

UNITED STATES PATENT AND TRADEMARK OFFICE
CERTIFICATE OF CORRECTION

| | |
|---|---|
| PATENT NO. | : 11,402,847 B2 |
| APPLICATION NO. | : 16/630820 |
| DATED | : August 2, 2022 |
| INVENTOR(S) | : Bingyan Xu |

It is certified that error appears in the above-identified patent and that said Letters Patent is hereby corrected as shown below:

On the Title Page

First Column, please add:
"(73) Assignee: HANGZHOU HIKROBOT TECHNOLOGY CO., LTD., Zhejiang (CN)".

Signed and Sealed this
Eleventh Day of April, 2023

Katherine Kelly Vidal
*Director of the United States Patent and Trademark Office*